July 24, 1956  M. B. WIDESS  2,755,879
PLANTING SEISMOMETERS
Filed July 2, 1951

INVENTOR:
MOSES B. WIDESS
BY Newell Pottoff
ATTORNEY

2,755,879
PLANTING SEISMOMETERS

Moses B. Widess, Tulsa, Okla., assignor to Stanolind Oil and Gas Company, Tulsa, Okla., a corporation of Delaware Application July 2, 1951, Serial No. 234,838

2 Claims. (Cl. 181—.5)

This invention relates to seismic geophysical surveying and is directed particularly to an improved procedure for planting seismometers to secure an optimum response characteristic.

The most exhaustive investigation of planting effects on seismometers is belived to be that of Washburn and Wiley published in Geophysics, vol. VI, pages 116–131 (April 1941). In that article the authors reported evaluating the effects of a number of soil conditions on seismometer response, and as a result two procedures were recommended for improving seismometer planting where obtaining good coupling to the ground was a problem. These suggestions were either (1) to bury the seismometer completely in an auger hole with dirt packed firmly around it, or (2) to set the seismometer on a post or stake driven down into firm contact with the subsurface soil. Complete burying and the mounting of the seismometers on stakes involve considerable time, labor, and expense that could very desirably be avoided.

A primary object of my invention, therefore, is the improvement of seismometer planting by a simple, rapid, and inexpensive procedure. A further object is to provide an improved seismometer planting procedure that is adaptable to a wide variety of soil conditions and is reliable as to the quality of the plant obtained. Other and further objects, uses, and advantages of the invention will become apparent as the description proceeds.

I have found that very good results, equal to or better than those afforded by the most tedious and careful planting methods heretofore generally used, are obtainable by pressing down the seismometer case firmly and with a twisting motion onto a slightly wetted soil surface. It is not necessary, and, in fact, it is undesirable that the ground be wet to a considerable depth; but only sufficient moisture is applied to modify the surface material actually coming into contact with and being compressed by the seismometer case as it is put into place.

Figure 2:
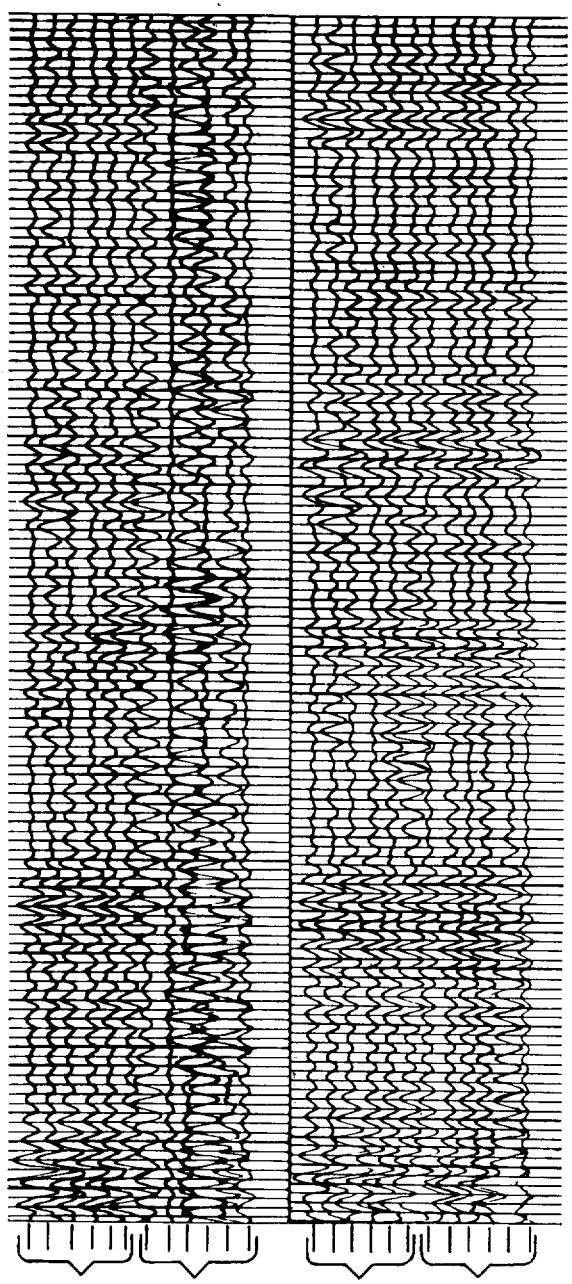
Figure 1:
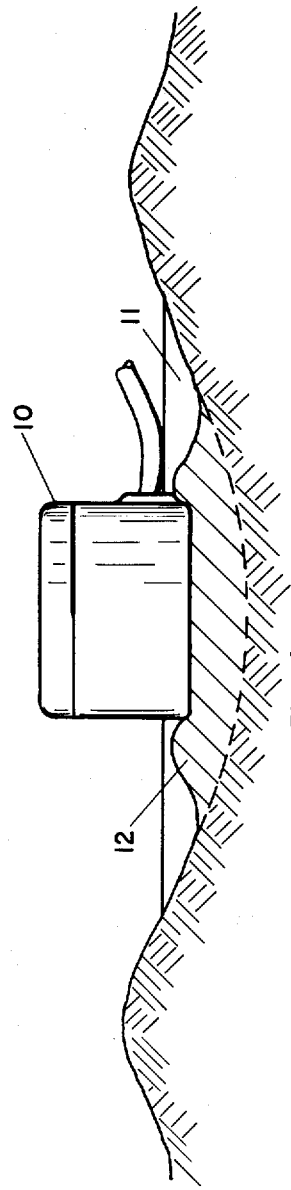

This will be better understood by reference to the accompanying drawing showing in Figure 1 a cross section of earth with a seismometer planted thereon in accordance with my invention, and in Figure 2 a reproduction of portions of actual records which show the comparative results of the planting procedure of the invention and other procedures.

Thus, as is indicated by Figure 1, the preferred planting technique for a seismometer 10 consists of first scraping away grass roots or loose surface dirt to form a shallow depression large enough for the seismometer base, and then adding a small quantity of water to wet the bottom of the depression to a shallow depth as indicated by the shading 12. The seismometer 10 is then pressed down on the moist earth 12 firmly and with a sliding or twisting rotary motion to produce a suction effect and to compact any loose soil and to level uneven contact points between the soil and the bottom of the seismometer case. This completes the planting procedure.

The preferred amount of water to be used is not at all critical as long as it is not so much as to soak the soil to a substantial depth of several inches. Some idea of the amount of moisture necessary may be gained from the fact that in routine field work, from 50 to 100 seismometers, each with a base area of between 3 and 6 square inches, may be planted using one gallon of water. About ½ ounce of water per square inch of base area of the seismometer is adequate although less or several times this amount such as from about ¼ to 1 ounce per square inch may be used without detriment.

Too much water should not be used. As Washburn and Wiley show in curve A of their Figure 5 (page 123 of reference), soil that is so wet as to be spongy is the worst of several planting materials. What is primarily desired is to produce only a temporary adhesion between the seismometer case and the ¼ or ½ inch layer of soil immediately below and contacting it. The presence of moisture in this soil layer during placement of the seismometer eliminates loose soil under the seismometer and avoids any possibility of its rocking.

It is not necessary that the adhesion due to the moisture continue throughout the entire period of time that the seismometer is in place for recording. In fact, it is preferred that the plant should become nearly dry in a few minutes.

A comparison of the results of various planting procedures, including that of my invention, is shown in Figure 2. This figure is a reproduction of portions of two seismic records, each made with twelve seismometers placed close together on the ground, arranged in two lines one foot apart with six seismometers spaced nine inches apart in each line. The top six traces of the upper record were made with the six seismometers of one line very carefully planted without using water. This "very careful planting" involved first clearing away the loose surface soil, grass roots, and the like, then rubbing the base of the seismometer back and forth or twisting it across the cleared surface to level off any high spots. Then the plant was tested to see if moderate pressures as by tapping with the finger at various points around the top of the seismometer would tilt or rock the seismometer, indicating any unevenness of contact between the seismometer case and the ground. The steps of rubbing or "grinding down" the ground surface and testing the plant were then repeated, normally several times, until good, firm, even contact with the ground was assured.

The six seismometers of the parallel line recorded as the bottom six traces of the upper record were given an "ordinary" dry plant which was the same as the plant of the first six seismometers, except that the seismometers were ground down into the earth only once, not repeatedly. While this ordinary planting procedure gives satisfactory ground coupling in many areas, there are some, as here, where it is entirely inadequate. Even a casual inspection of the top twelve-trace record shows that, whereas there is good duplication between the upper six traces, the record made by the lower six traces indicates that the plant of those seismometers is practically worthless.

The lower twelve-trace record was made with the same twelve seismometers in the same positions as for the upper records. The six carefully dry-planted seismometers were not disturbed, while the six receiving the ordinary plant were taken up and put down again after pouring a little water on the soil in a spot into which each seismometer was then pressed with a twisting or screwing motion.

The outstanding improvement of the "ordinary plant" seismometers with water added is clearly evident in the bottom six traces of the lower record. The duplication between these traces is at least as good as, and generally better than, that between the upper six traces of the lower record made by the six very carefully dry-planted seismometers. On the basis of such evidence as this, the wet-planting procedure of the invention has gone into routine field use.

While I have thus described my invention in terms of its simplest embodiment, it is to be understood that modifications thereof may be employed to obtain the benefits set forth. Thus other liquids than water capable of wetting the soil may be used if preferred, and the fluid penetration of the soil may be retarded by adding colloidal agents such as bentonite or starch to the liquid if desired. The scope of the invention, therefore, should properly be ascertain by reference to the appended claims.

I claim:

1. In a seismic geophysical surveying, the method of providing an improved seismic-wave detector plant against the ground surface comprising the steps of wetting a small substantially horizontal area of the ground surface to a depth of the order of ¼ to ½ of an inch, forcing the base of a seismic-wave detector into contact with the wetted area, and allowing said area to become substantially dry before using said plant.

2. In seismic geophysical surveying, the method of providing an improved seismic-wave detector plant against the ground surface comprising the steps of clearing a small substantially horizontal area of the ground surface of loose soil and the like to form a small depression large enough to receive the base of a seismic-wave detector, pouring into the bottom of said depression between about ¼ and 1 ounce of water per square inch of base area of the detector, forcing the base of a detector downward into the wetted area of said depression with a twisting movement, and allowing said wetted area to become substantially dry before using said plant.

References Cited in the file of this patent

UNITED STATES PATENTS

| | | |
|---|---|---|
| 1,923,088 | Hayes | Aug. 22, 1933 |
| 1,951,358 | Hayes | Mar. 20, 1934 |
| 2,364,209 | Green | Dec. 5, 1944 |
| 2,499,605 | Nicolson | Mar. 7, 1950 |
| 2,582,994 | Kendall | Jan. 22, 1952 |